Dec. 4, 1962 W. H. CROSBY, JR., ET AL 3,066,672
METHOD AND APPARATUS FOR SERIAL SAMPLING OF INTESTINAL JUICE
Filed Sept. 27, 1960
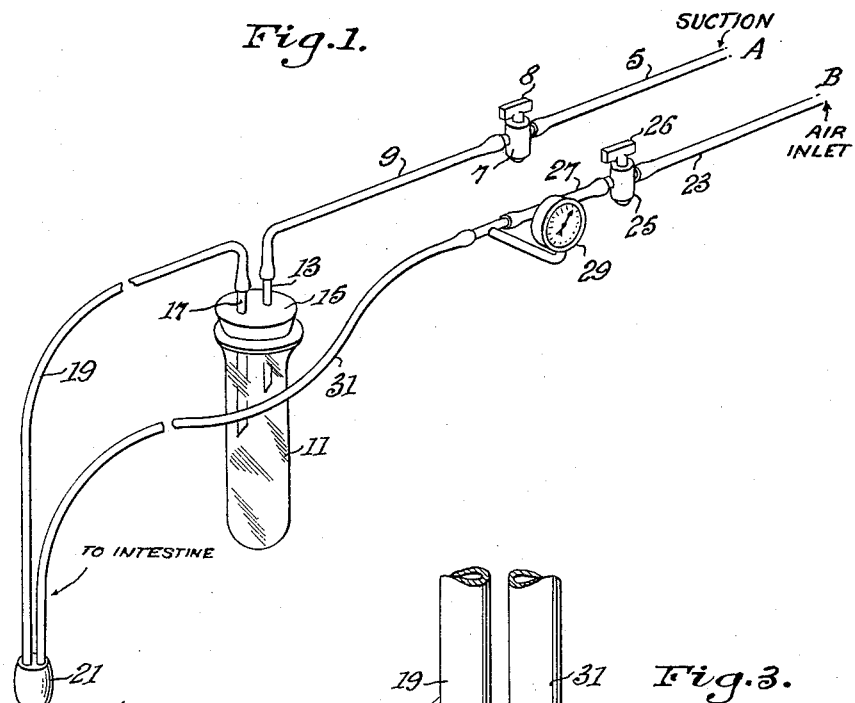
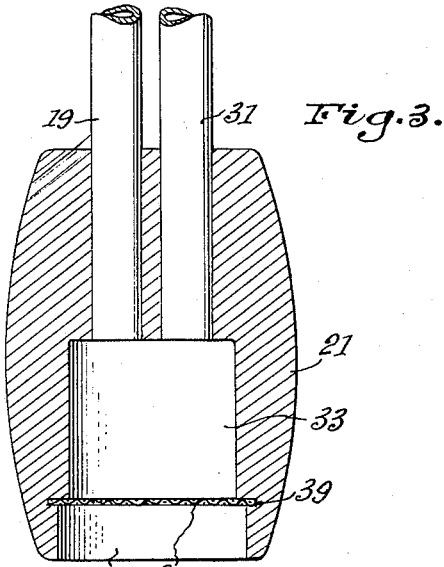
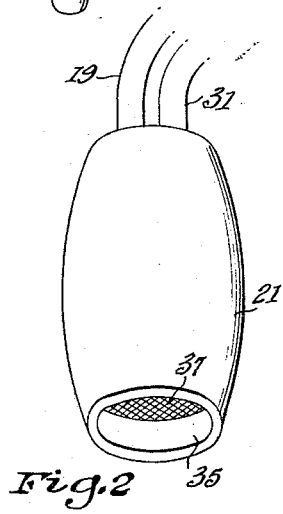
INVENTORS
WILLIAM H. CROSBY, JR.
HEINZ W. KUGLER
BY Joseph A. Hill
Binford Hamilton
ATTORNEYS United States Patent Office 3,066,672
Patented Dec. 4, 1962

3,066,672
METHOD AND APPARATUS FOR SERIAL SAMPLING OF INTESTINAL JUICE
William H. Crosby, Jr., United States Army (Walter Reed Medical Center), and Heinz W. Kugler, 9738 51st Place, College Park, Md.
Filed Sept. 27, 1960, Ser. No. 58,857
6 Claims. (Cl. 128—276)
(Granted under Title 35, U.S. Code (1952), sec. 266)

The invention described herein may be manufactured and used by or for the Government for governmental purposes without the payment of any royalty thereon.

The present invention provides improvements in surgical suction apparatus, and more particularly to improved suction tube apparatus for use in widely variant phyisological applications or manipulations, such as decompressing a distended stomach or intestine for withdrawing contents of the stomach or intestine in gastric analysis procedures, and still more particularly the obtaining of samples of intestinal juices by drainage or aspiration; or by reversal, the herein-described apparatus also may be employed in introducing fluids to the stomach or intestine for treating purposes.

However, the instrument of the present invention has been developed primarily for the purpose of obtaining serial samples of intestinal juice, either by continuous or intermittent sampling, at one level or at many levels between the duodenum and the end of the ileum, so that the present improved instrument may be used to study the progress of digestion and absorption, or, diagnostically, it may be used to establish the level in the intestine at which any bleeding may be taking place.

In order to obtain a specimen of intestinal juice by drainage or aspiration through a tube, it is necessary that the volume of material be greater than the capacity of the tube. For example, if it be attempted to aspirate through a long tube when there is only 1 cc. of juice, the material can come part way, but the wall of the intestine collapses and blocks the end of the tube when all the juice has been evacuated from the area. A tube with an internal diameter of 2 mm. has a capacity of approximately 3 cc. per meter, and because of this limitation, it has been difficult or impossible to sample adequately the intestinal contents at various levels of the jejunum and ileum.

It is thought that the objects of the present invention will be apparent from the foregoing statements, but additional objects and advantages of the improved instrument will become apparent as the description proceeds; and the features of novelty will be pointed out in particularity in the appended claims. It may be said, in general, that the sampling instrument of the present invention is simple in principle and relatively comfortable and uncomplicated in its application.

The construction of the present improved instrument will be understood more readily by reference to the accompanying drawings, in which:

FIG. 1 is a perspective view of the entire assembled instrument of the present invention;

FIG. 2 is an enlarged view of a sample-taking pellet cup adapted to be swallowed by a subject and passed into the intestine; and FIG. 3 is a vertical section taken on the center line of FIG. 2, but on a further enlarged scale showing details of the interior construction of the sample-taking pellet cup.

The construction of the improved instrument of the present invention comprises generally a tubular suction side A and a tubular air-venting side B, through which air in controlled amounts may be admitted to the instrument, or through which the instrument may be vented to atmospheric air. The construction and operation of the instrument is substantially self-evident from the drawings.

However, it will be seen from the drawings that the suction side A of the improved instrument comprises a tubular section 5 which connects a source of suction, not shown, with a control valve 7 having a stop cock 8, which valve in turn is connected by a suitable length of tubing 9 to a specimen receiving trap or test tube 11, the length of tubing 9 being connected with and opening into the specimen-receiving test tube or trap 11 by way of a short length of rigid (glass) tubing 13 which opens into the receiver 11 through a two-hole stopper 15 inserted in the mouth of the specimen-receiver 11. A second short length of rigid (glass) tubing 17 passes through the other hole in the stopper 15 into the interior of the receiver 11. A flexible length of tubing 19 connects the rigid tubing 17 to the interior of a bubble trap or cup 21.

The venting side B of the instrument comprises an air inlet section of tubing 23, which opens to the atmosphere and leads to a control valve 25, provided with a stop cock 26, which in turn is connected through a section of tubing 27 to a pressure-indicating manometer or gauge 29, this latter in turn being connected by way of a suitable length of flexible tubing 31 to the bubble trap 21 to indicate the amount of suction thereon.

The tubing sections 19 and 31 of the suction and vent sides respectively are slender flexible tubes which are joined at their tips by the bubble-cup or bubble-trap 21, the tubes 19 and 31 opening into an internal chamber of the cup or bubble-cup 21 and are suitably secured in place in parallelism. The bubble-trap or cup 21 may be composed of suitable plastic material which is inert to stomach and intestinal juices and which may be either opaque or transparent, such characteristics applying also to the tubes 19 and 31.

In practice, the bubble-trap or cup 21 is a small, cup-shaped pellet about 8 mm. in diameter and about 12 mm. long, and is provided with an open mouth 35 for its internal chamber 33, the mouth 35 being covered however by a fine mesh screen 37 which is secured in a groove 39 provided around the chamber 33 for reception of the said screen 37.

As there has been noted above, to obtain a sample of intestinal juice by drainage or aspiration through a tube, it is necessary that the volume of material be greater than the capacity of the tube. For example, a tube with an internal diameter of 2 millimeters has a capacity of 3 ml./m. If there is an attempt to aspirate through such tube when there is only 1 ml. of juice, the material can travel only part way before all of the juice has been removed from the lumen, and the intestinal mucosa then blocks the end of the tube; because of this limitation, it has been difficult or impossible to sample adequately the intestinal contents at various levels of the jejunum and ileum.

Therefore, the instrument of the present invention was developed for obtaining serial samples of intestinal juice. With the present improved instrument, specimens less than 0.5 ml. in volume can be delivered rapidly through tubes as long as 5 meters. The sampling may be continuous or intermittent, at one level or at many levels between the duodenum and the end of the ileum.

The principle involved in the use of the present improved instrument is that of intubation and displacement. Intubation is accomplished by having the subject swallow the two slender tubes 19 and 31 which are joined at their tips by the open end "bubble trap" cup 21, which, of course, also is swallowed. Intestinal juice is aspirated up one tube (tube 19) until blocked by the mucosa, or until a predetermined volume has been pulled into the tube 19. To move the specimen up and out of the tube, air is allowed to flow into the tube below the specimen while suction is maintained above the specimen. Air from the outside is let in through the bubble trap cup 21 by means of the second tube 31 that runs parallel to the first tube 19.

Also as has been noted above, the mouth of the bubble trap cup 21 is covered with a fine mesh screen 37 to prevent aspirating bits of food or sucking the mucosa into the cup 21 and injuring it. The fine mesh screen 37 and the surface tension at the screen 37 tend to prevent fluids from entering the cup 21 until pressure in the cup is lowered.

The cup 21 is swallowed together with sufficient tubing to permit it to pass into the intestine. To collect a sample of intestinal juice, suction is applied to one of the tubes (tube 19) while the other is kept shut by closure of valve 25. When the fluid around the cup 21 has been removed, the suction pulls the intestinal mucosa against the screen 37 and thereby closes the mouth 35 of the cup. Suction on the tube 19 is maintained and a little air is permitted to leak into the tube 31. This allows the specimen of intestinal juice to move up the tube 19 to the level where the specimen-receiving receptacle or trap 11 is in the line to catch the specimen. After the mucosa has been pulled against the screen 37, it remains there so long as the pressure in the cup 21 is kept low, this valve action of the mucosa preventing any additional juice from being aspirated. Thus, each specimen can be isolated by this valve effect of the mucosa held against the screen 37. If desired, the system can be washed out between specimens.

While gentle suction is being maintained, the specimen of intestinal juice travels up the tubing 19 followed by the air admitted through tubing 31. The appearance of air in the tubing 19 at the receiving trap 11 marks the end of the specimen. As soon as the specimen has been collected in the receiving trap, the test tube of the trap is changed. Removal of the test tube of the trap breaks the vacuum in the system and releases the mucosa from the screen 37. Now another specimen can be taken at the same level, or, by permitting peristalsis to carry the cup 21, the next specimen can be taken at a lower level. If the tubes 19 and 31 attached to the cup 21 are of sufficient length, it is possible to sample the intestinal contents through the entire length of the small bowel. In cases of intestinal bleeding, it may be possible to establish the level at which blood is lost by testing each specimen as it is received, using the benzidine reaction or some other indicator.

It will be understood that the specific apparatus herein described and illustrated on the accompanying drawings represents a preferred embodiment of the apparatus of the instant invention, but it will be apparent that structural details of the instrument may be varied as will become apparent to one skilled in the art without departing from the scope of the invention, and, accordingly it will be understood that it is intended and desired to embrace within the scope of the invention such modifications and changes as may be necessary or desired to adapt the invention to varying conditions and uses as defined by the appended claims.

We claim:

1. A process of sampling fluid contents of a fluid-containing lumen of a collapsible tubular element, which comprises inserting into the lumen sample-taking means tubularly flexibly connected to a specimen-receiver, aspirating a specimen of the fluid into the sample-taking means, continuing aspirating the specimen to the specimen-receiver, terminating the specimen by aspirating air into the sample-taking means at selected intervals of time, and continuing the specimen-taking and interruption thereof until the tubular element is depleted of fluid while restraining the collapsible tubular element from obstructing the sample-taking means during aspirating of the specimen.

2. A process of sampling intestinal fluid juices which comprises introducing into an intestinal lumen containing juices to be examined specimen cup means provided with an open mouth covered by a small mesh screen and tubularly flexibly connected to a specimen-receiving vessel, drawing a specimen of the intestinal juices into the cup means by applying suction to the cup means until the juices pass through the screen into the cup means, continuing application of suction above the juices drawn therein until the screen becomes substantially sealed with intestinal mucosa, breaking the suction in the cup means by venting air into the said cup means while continuing application of suction above the specimen in the cup means, thereby interrupting continuity of the specimen and obtaining a complete specimen for examination and withdrawing the resulting specimen from the cup means into the specimen-receiving vessel by continuing applying aspirating suction to the specimen above the specimen.

3. A process of taking specimens of intestinal fluid juices from the small intestine, which comprises passing into the small intestine specimen cup means having an open mouth covered by a screen and tubularly flexibly connected to a specimen-receiving vessel, the specimen being passed into the cup means by applying suction to the cup means while the cup means are positioned in the small intestine, thereby aspirating fluid from the small intestine into the cup means through the screen, allowing the screen on the cup means to become substantially sealed by intestinal mucosa while continuing application of suction to the cup means above the resulting collected fluid specimen, completing collection of the fluid specimen by venting air into the cup means while continuing suction on the specimen above the said specimen, thereby breaking the vacuum produced in the cup means by the suction, and withdrawing the resulting completely collected specimen into the specimen-receiving vessel by continued application of suction to the specimen above the said specimen.

4. An instrument for obtaining specimens of intestinal juices, which comprises a hollow specimen-obtaining cup member adapted to be swallowed by a subject being examined, a flexible suction tube entering the cup member and connecting the cup member to a specimen-receiving means, a second flexible tube entering the cup member and communicating at its tip with the flexible suction tube and in parallelism therewith, both flexible tubes having a length enabling the cup member to enter and to pass through an intestinal lumen containing fluid to be examined, the second flexible tube being a venting tube for enabling air to be introduced into the cup member, tubular means connecting the specimen-receiving means to a source of suction, suction-indicator means connected to the second flexible tube and means for venting the second flexible tube to atmospheric air.

5. An instrument as claimed in claim 4, wherein the flexible tubes comprise a pair of substantially parallel branches for the cup member, and a control valve in each of the branches for controlling amounts of suction and of air present in the respective branches of the instrument.

6. An instrument as defined in claim 5, wherein the cup member has an open mouth and a screen secured to the cup member and extending across the open mouth, the said screen being of a mesh smaller than the smallest sized particles of solid materials likely to be present in the juices to be examined, the screen thereby filtering substantially all solid materials from the juices prior to reception of the juices into the cup member.

References Cited in the file of this patent

UNITED STATES PATENTS

| | | |
|---|---|---|
| 714,738 | Perry | Dec. 2, 1902 |
| 2,470,665 | Stiehl | May 17, 1949 |
| 2,489,067 | Wild | Nov. 22, 1949 |
| 2,939,460 | Sorenson | June 7, 1960 |